(12) United States Patent
Couch

(10) Patent No.: US 8,897,804 B2
(45) Date of Patent: Nov. 25, 2014

(54) SYSTEM AND METHOD FOR PROVIDING CUSTOMER SUPPORT USING A LOCATION-AWARE PORTABLE DEVICE

(75) Inventor: Matthew Couch, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 13/461,076

(22) Filed: May 1, 2012

(65) Prior Publication Data

US 2013/0295909 A1 Nov. 7, 2013

(51) Int. Cl.
*H04Q 7/20* (2006.01)

(52) U.S. Cl.
USPC ............. 455/456.1; 455/456.3; 455/456.2; 455/456.6; 455/67.11; 455/435.1; 455/404.2; 455/457; 455/459

(58) Field of Classification Search
None
See application file for complete search history.

(56) References Cited

U.S. PATENT DOCUMENTS

| | | |
|---|---|---|
| 7,336,942 B2 | 2/2008 | Wang |
| 7,908,211 B1 | 3/2011 | Chen et al. |
| 8,116,748 B2 * | 2/2012 | Aaron .................. 455/414.2 |
| 2011/0205965 A1 | 8/2011 | Sprigg et al. |
| 2011/0244892 A1 * | 10/2011 | MacManus et al. ......... 455/457 |

OTHER PUBLICATIONS

U.S. Appl. No. 13/016,526; of Peter Som De Cerff; "Systems and Methods for Automating Customer Premises Equipment Registration" filed Jan. 28, 2011.

* cited by examiner

*Primary Examiner* — Charles Appiah
*Assistant Examiner* — Randy Peaches
(74) *Attorney, Agent, or Firm* — Smith Risley Tempel Santos LLC; Michael J. Tempel

(57) ABSTRACT

A portable technical support device includes a location-determining element configured to allow the portable technical support device to be location-aware, and a communicating element configured to allow the portable technical support device to access a network management system, the network management system having information relating to a communication device, wherein the portable technical support device obtains from the management system the information relating to the communication device by making the network management system aware of the location of the communication device using the portable technical support device as a location-determining element.

10 Claims, 8 Drawing Sheets

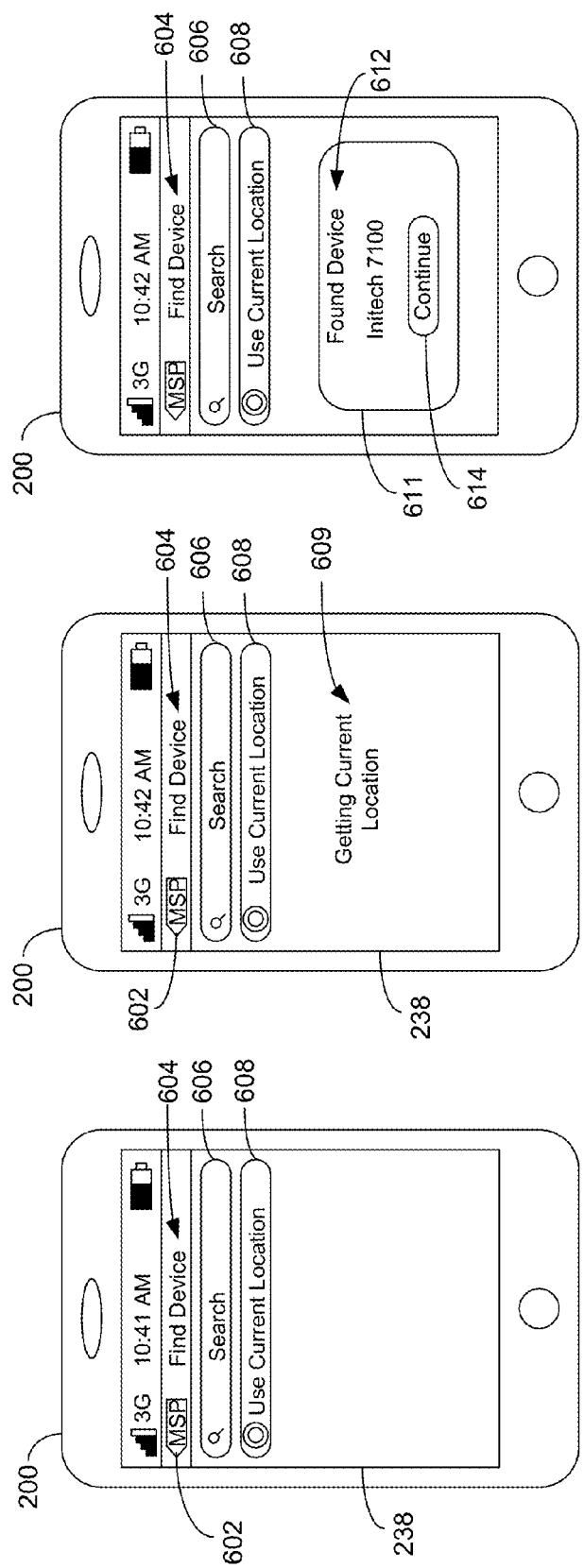

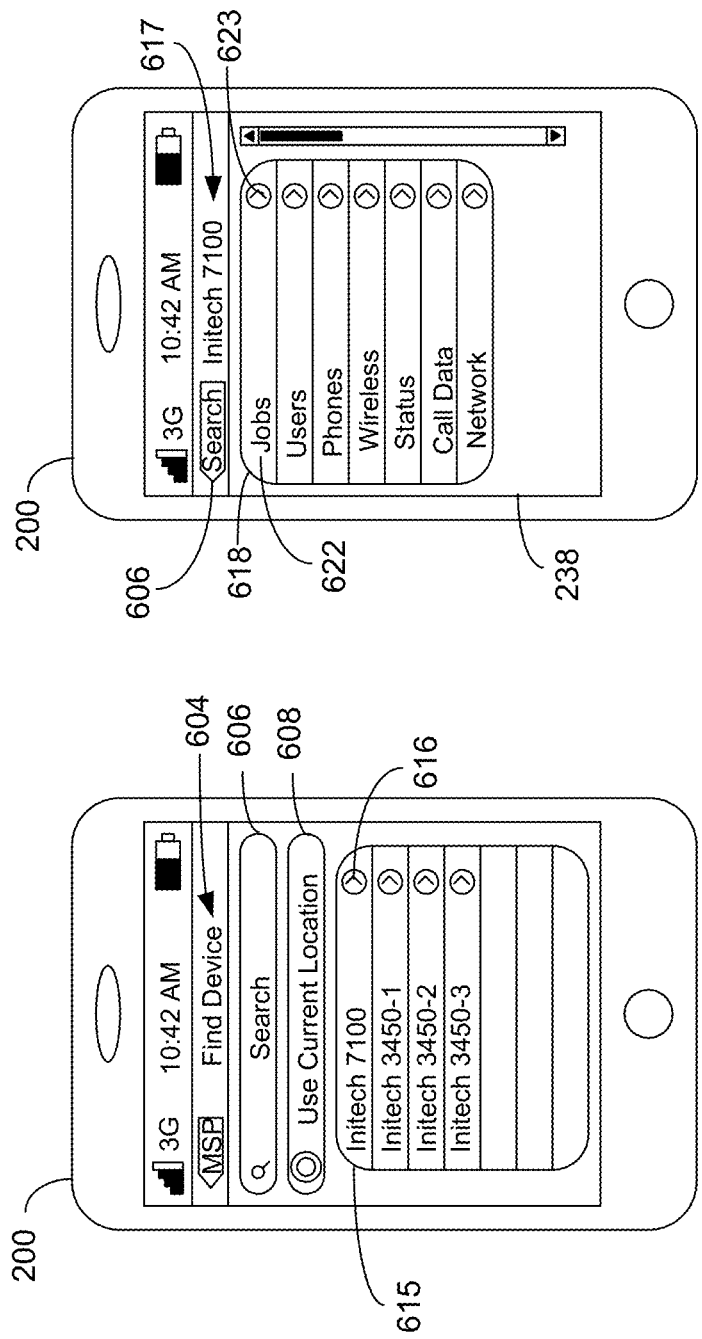

SYSTEM AND METHOD FOR PROVIDING CUSTOMER SUPPORT USING A LOCATION-AWARE PORTABLE DEVICE

BACKGROUND

Many different types, models and versions of complex communication devices are implemented at customer locations. These communication devices periodically require testing, troubleshooting, maintenance, upgrading, and other interactions. Often, more than one type, model or version of communication device is located at a particular location. Moreover, each communication device may have a unique configuration and operating parameters. When performing testing, troubleshooting, maintaining, upgrading or other procedures, a technical support individual needs to know the precise configuration of each particular communication device. Further, in order to correct problems, or add or change functionality, the technical support individual must be able to check the status of the communication device and, if desired, update the configuration of that communication device.

In many instances, obtaining the precise configuration information of a particular communication device, especially when the subject communication device is one of a number of communication devices at the same location, requires that the technical support individual use a diagnostic device to connect directly to the subject communication device, or access a separate database to obtain the subject communication device's configuration. Connecting directly to the communication device also has challenges, such as clearing the customer's firewall, and other connectivity issues. Further, each of these tasks consumes valuable time and resources.

Therefore, it would be desirable to have a convenient way of learning and accessing the configuration of a communication device that overcomes the above-mentioned challenges.

SUMMARY

Embodiments of a portable technical support device include a location-determining element configured to allow the portable technical support device to be location-aware, and a communicating element configured to allow the portable technical support device to access a network management system, the network management system having information relating to a communication device, wherein the portable technical support device obtains from the management system the information relating to the communication device by making the network management system aware of the location of the communication device using the portable technical support device as a location-determining element.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

FIGS. 6A through 6G are a series of diagrams showing an example of the operation of an embodiment of the system and method for providing customer support using an exemplary location-aware portable device.

DETAILED DESCRIPTION

Figure 1:
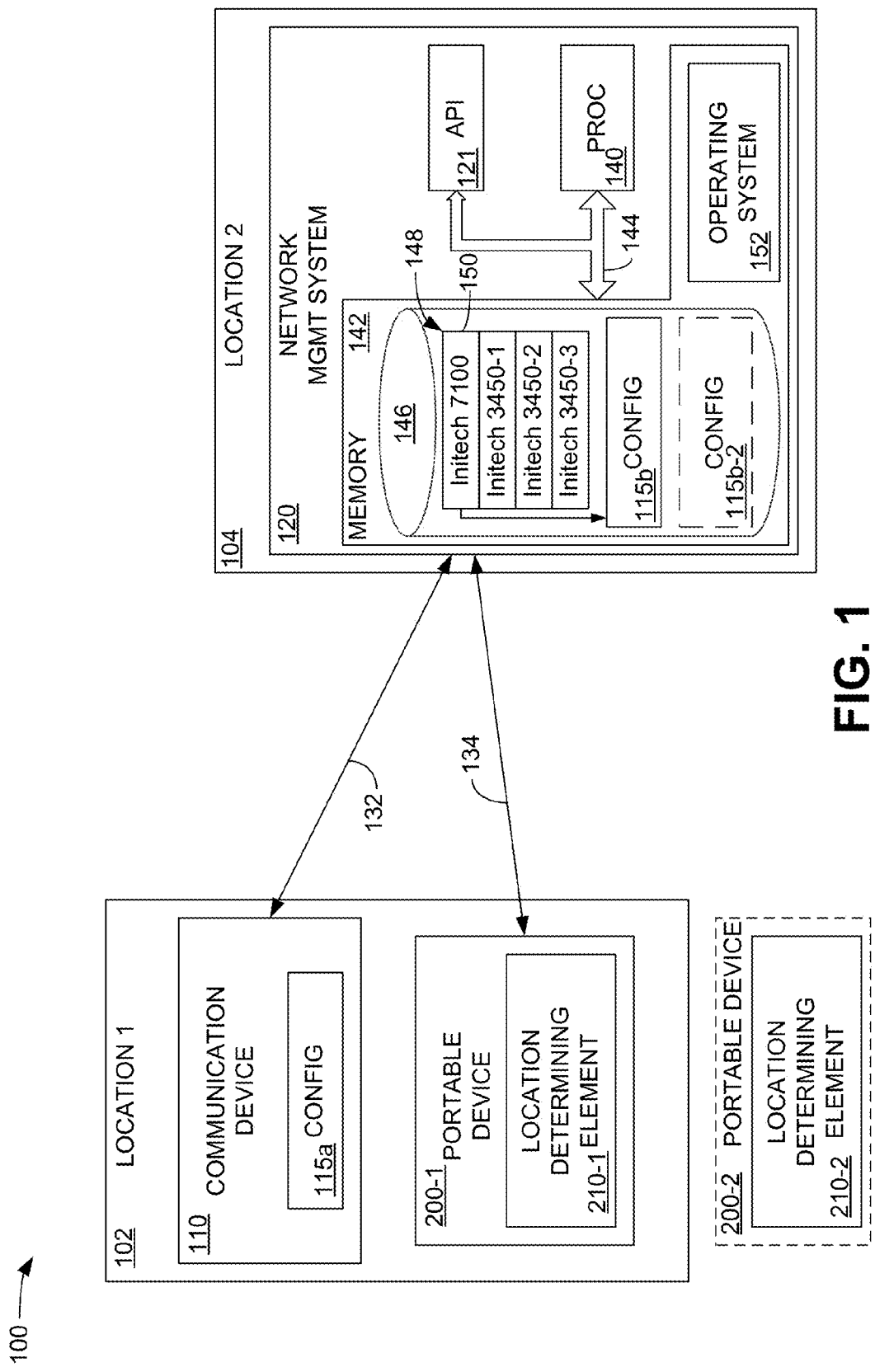
FIG. 1 is a block diagram illustrating an exemplary system within which the system and method for providing customer support using a location-aware portable device can be implemented.

Although described with particular reference to a communication device, the system and method for providing customer support using a location-aware portable device can be implemented with a variety of communication devices, network devices, other devices located at customer locations, and location-aware devices. Examples of communication devices include, but are not limited to, routers, network switches, fiber-optic communication devices, and any other communication devices. Examples of a location-aware portable device include, but are not limited to, a smart phone, a personal digital assistant (PDA), a tablet, a portable computer, and any type of location-aware portable device.

The system and method for providing customer support using a location-aware portable device can be implemented in hardware, software or a combination of hardware and software. When implemented in hardware, the system and method for providing customer support using a location-aware portable device can be implemented using specialized or generally known hardware elements. When implemented in software, the system and method for providing customer support using a location-aware portable device can be implemented using processor-executable code running on a computing device. The software can be stored in a memory and executed by a suitable instruction execution system (microprocessor). The hardware implementation of the system and method for providing customer support using a location-aware portable device can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), a separate, specially designed integrated circuit, etc.

A portable device, such as a PDA, smartphone, etc., can be used to access configuration data of a communication device using location-based technology, such as global positioning system (GPS) data. The configuration data of the communication device is typically maintained in a database along with the geographical location of the communication device. A portable device, such as a PDA, a smartphone, or another location-aware device, can access the configuration data of the communication device from a management system, or other third-party system, based on the geographical location of the communication device and of the portable device. The configuration data of the communication device can also be electronically delivered to the portable device, based on the location of one or more of the communication device and the portable device.

If the configuration of the communication device is not accessible, has not been provided ahead of time, or if the location of the communication device has not been assigned, the location-aware portable device can have a "set location" feature that could match the communication device's location to the location of the portable device, thereby establishing the location of the communication device to a management system.

FIG. 1 is a block diagram illustrating an exemplary system 100 within which the system and method for providing customer support using a location-aware portable device can be implemented. The system 100 comprises a first location 102 and a second location 104. The first location 102 can be coupled to the second location 104 using exemplary connections 132 and 134. The connections 132 and 134 can be any wired, wireless, optical, or any other bi-directional high-speed, medium speed or low-speed communication links, as known in the art. As an example, the connection 134 can be implemented wirelessly to communicate using extensible markup language (XML) over a hypertext transfer protocol (HTTP) connection. As an example, the connection 132 can be implemented using a wired or wireless connection and implementing a standard communication protocol as known in the communication arts or a proprietary communication protocol.

The first location 102 generally includes one or more communication devices, illustratively shown using a single communication device 110. The communication device 110 includes a configuration 115a. The configuration 115a is a general representation illustrating all of the operating parameters of the communication device 110.

The second location 104 can be a telephone company central office, a switching station, a public or private network location, a customer location, a network management center, or any other location that is typically located so as to communicate with the first location 102. As an example, the first location 102 can be a customer location having the communication device 110 and the second location 104 can be a telephone company central office or a network management location having a network management system 120 in communication with the communication device 110. The network management system 120 can be any network management system that is configured to control, correspond with, and communicate with the communication device 110. In an embodiment, the network management system 120 can be implemented as a server computing device and includes a processor 140 connected to a memory 142 over a logical and physical bus 144. The logical and physical bus 144 allows each of the connected elements to communicate directly or indirectly with each other. The processor 140 can be any general purpose or specific purpose processor capable of executing instructions contained in the memory 142. The memory 142 can be a memory module, a memory system having a number of memory elements, a distributed memory system having multiple modules located at different locations, or any other type of memory suitable for storing software and firmware instructions. The memory 142 can be random access memory (RAM), read only memory (ROM), volatile memory, non-volatile memory, a removable memory element, such as a flash drive, or any other type of memory. The logical and physical bus 144 allows each of the connected elements to communicate directly or in directly with each other. The memory 142 includes a database 146 that can contain one or more elements of information pertaining to the communication device 110 and an operating system 152 that can be executed by the processor 140 to control and implement the operation of the network management system 120. In this example, the database 146 includes a list 148 of communication devices, one of which can be the communication device 110. The list 148 of communication devices can be a listing of all communication devices maintained by the network management system 120, can be a list of communication devices located at the first location 102, or can be a list of communication devices located at one or more locations. The configuration 115b is shown as being associated with the communication device 150, which, in this example, can be information corresponding to the communication device 110 located at the first location 102. The database 146 can be implemented in a number of ways known to those skilled in the art. Further, the memory 142 can contain one or more elements of information pertaining to more than one communication device 110. In an embodiment, the database 146 can contain configuration 115b, which mimics, or which is a mirror copy of the configuration 115a in the communication device 110. The network management system 120 also includes an application programming interface (API) 121 that controls various aspects of the operation of the network management system 120 and its interaction with the communication device 110. Although shown as connected to the logical and physical bus 144, the application programming interface 121 can be a separate element, or can be outside of the network management system 120.

In an embodiment, the first location 102 also includes a portable device 200. The designator 200 refers to any of a number of different portable devices, and for ease of illustration, the reference numeral 200-1 generally refers to a portable device 200-1 that is located at the first location 102. However, the portable device 200 may also be located at, nearby, or within the first location 102, or indeed may be in route to the first location 102 and as such is also illustrated in dotted line using reference numeral 200-2 as being external to the first location 102. In accordance with an embodiment of the system and method for providing customer support using a location-aware portable device, the portable device 200-1 comprises a location determining element 210-1. The location determining element 210-1 generally allows the portable device 200-1, and importantly, the location of the portable device 200-1, to be determined using an external location determining reference system, such as, a global positioning system (GPS), cellular triangulation, WiFi, or any other location determining system. In an embodiment, the portable device 200 can be a cell phone, a smart phone, a PDA, a specialized customer service device specific to the communication device 110, or can be a general troubleshooting and maintenance device.

Figure 2:
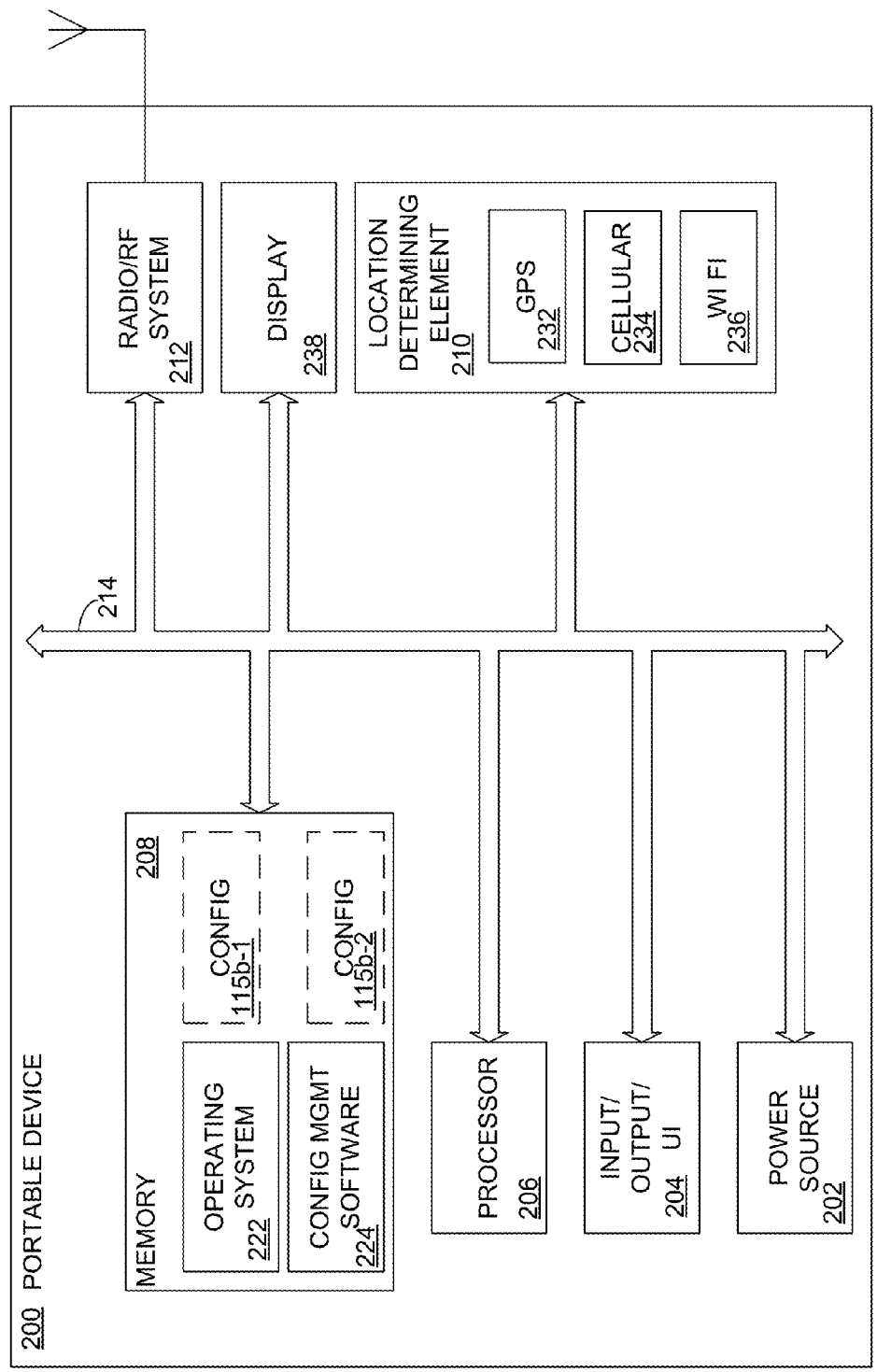
FIG. 2 is a block diagram illustrating an embodiment of the portable device of FIG. 1.

FIG. 2 is a block diagram illustrating an embodiment of the portable device 200 of FIG. 1. The portable device 200 is illustrated in FIG. 2 generically using reference numeral 200 because it can be located at the first location 102 (e.g., device 200-1 of FIG. 1) or outside of, or away from, the first location 102 (e.g., device 200-2 of FIG. 1). The portable device 200 generally comprises a power source 202, an input/output/user interface element 204, a processor 206, memory 208, a location determining element 210, a radio/RF system 212, and a display 238, all coupled together over a logical and physical bus 214. The logical and physical bus 214 allows each of the connected elements to communicate directly or indirectly with each other. The radio/RF system 212 is a communicating element that allows the portable device 200 to communicate wirelessly, over, for example, connection 134 shown in FIG.

1. The processor 206 can be any general purpose or specific purpose processor capable of executing instructions contained in the memory 208. The memory 208 can be a memory module, a memory system having a number of memory elements, a distributed memory system having multiple modules located at different locations, or any other type of memory suitable for storing software and firmware instructions. The memory 208 can be random access memory (RAM), read only memory (ROM), volatile memory, non-volatile memory, a removable memory element, such as a flash drive, or any other type of memory.

The power source 202 can be a direct current (DC) power source, such as a battery, an alternating current (AC) power source, such as an AC to DC adapter, or any other power source. The input/output/user interface element 204 can be one or more of a keypad, a microphone, a speaker, a touch pad, a pointing device, a trackball, or any other way of communicating with a cellular phone, a PDA, or the like.

The portable device 200 includes a processor 206, which can execute software stored in the memory 208, to control the operation of the portable device 200. As an example, the memory 208 comprises an operating system 222, configuration management software 224 and a representation of the configuration 115*b* received from the network management system 120 (FIG. 1). The configuration management software 224 can be implemented in a number of ways, including, for example, as an executable application that is stored on and that runs on the portable device 200. The configuration management software 224 can be stored and transported on any computer-readable medium for use by or in connection with an instruction execution system that can fetch and execute instructions. In the context of this document, a "computer-readable medium" can be any means that can contain or store a computer program for use by or in connection with an instruction execution system. The representation of the configuration 115*b* can be a full representation or can be a partial representation of the configuration 115*b* that is located on the network management device 120 (FIG. 1). In FIG. 2, the representation of the configuration 115*b* is shown in dotted line and referred to as 115*b*-1 because it is an instance of the configuration of the communication device 110 that is maintained by the network management system 120, and sent on request to the portable device 200. Depending on the task to be performed on the communication device 110, the configuration management software 224 can request a full version or a partial version of the configuration 115*b* from the network management system 120.

In an embodiment, the processor 206 executes the operating system 222 to control the normal operations of the portable device 200. The configuration management software 224, also executed by the processor 206, allows the portable device 200 to request, receive, decipher, and modify the configuration 115*b*-1 received from the network management system 120 (FIG. 1) to develop a modified configuration 115*b*-2. The modified configuration 115*b*-2 can then be forwarded to the network management system 120, which can update the configuration of the communication device 110 (FIG. 1) without the portable device 200 directly accessing the communication device 110 (FIG. 1).

The location determining element 210 illustratively includes a GPS element 232, a cellular element 234, and a Wi-Fi element 236. Any of the GPS element 232, the cellular element 234, and the Wi-Fi element 236 can be used alone or in combination with each other to allow the portable device 200 to determine its geographic location.

Figure 3:
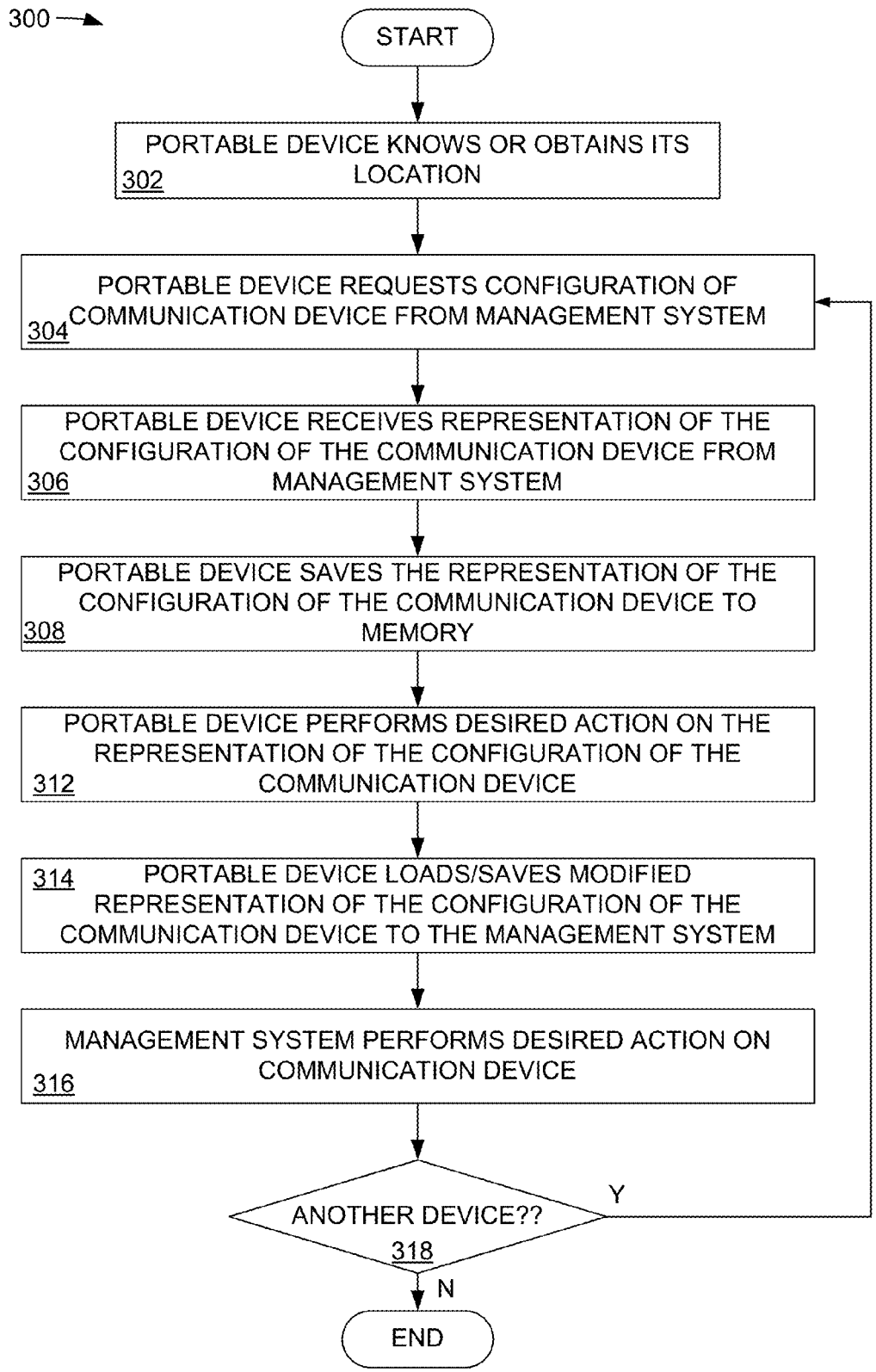
FIG. 3 is a flowchart describing the operation of an embodiment of the system and method for providing customer support using a location-aware portable device.

FIG. 3 is a flowchart 300 describing the operation of an embodiment of the system and method for providing customer support using a location-aware device. FIG. 3 illustrates the operation of a portable device after it is located at the first location 102, in close proximity to the communication device 110.

In block 302, the portable device 200 knows or obtains its location, using any of the technologies described in conjunction with the location determining element 210. The location determining element 210 allows the portable device 200 to use information in the network management system 120 to search for a communication device 110 (FIG. 1) linked to that location. As an example, the network management system 120 maintains the location and configuration of the communication device 110 in the database 146. The portable device 200 will communicate its location to the network management system 120 over connection 134, have access to the database 146, and search for the communication device 110 using the knowledge maintained in the network management system 120. As an example, the portable device 200 and the network management system 120 can interact in a client-server relationship, where the portable device 200 is the client and the network management system 120 is the server. The portable device 200 accesses and searches the database 146 for information relating to the communication device 110.

Filtering can be provided such that the portable device 200 accesses and receives only the configuration and data relating to the communication device 110 (or other communications devices) located at the subject first location 102. Depending on the design and implementation of the configuration management software 224 running on the portable device 200, the portable device 200 may request a partial configuration or the entire configuration of the communication device 110. The amount of the configuration of the communication device 110 to request is determined by a combination of the API 121 running on the network management system 120 and the requirements and instructions of the customer associated with the communication device 110. If a single communication device 110 is identified by the network management system 120 as being located at the first location 102, the portable device 200 can request some or all of the configuration 115*b* of the communication device 110 from the network management system 120 and can immediately begin editing the configuration 115*b* of the communication device 110. If there are multiple communication devices at the subject first location 102, then a user of the portable device 200 will select one communication device from a list of communication devices. The portable device 200 will then request the configuration of the selected communication device.

In block 304, the portable device 200 requests the configuration 115*b* of the communication device 110 from the management system 120.

In block 306, the portable device 200 receives the representation of the configuration 115*b* of the communication device 110 from the management system 120 over connection 134 (FIG. 1).

In block 308, the portable device 200 saves the representation of the configuration 115*b* of the communication device 110 to its internal memory 208. In an embodiment, the portable device 200 receives the configuration 115*b* and saves it to memory 208 as configuration 115*b*-1.

In block 312, the portable device 200 performs the desired action on the representation of the configuration 115*b*-1 of the communication device 110. This can entail updating the configuration, modifying the configuration, changing the configuration, performing maintenance on the configuration, or any other action performed on the configuration 115*b*-1 located within the portable device 200. The modified configuration is shown as 115*b*-2.

In block 314, the portable device 200 saves a modified representation of the configuration 115b-2 relating to the communication device 110 to the management system 120. Importantly, the portable device 200 does not directly interact with the communication device 110, but instead, receives the configuration 115b from the network management system 120, modifies the configuration as needed, and then transfers, delivers, sends or otherwise provides the modified configuration 115b-2 to the network management system 120.

In block 316, the network management system 120 performs the desired action on the communication device 110, as per the modified configuration 115b-2 received from the portable device 200.

In block 318 it is determined whether there is another communication device 110 to be serviced. In the example shown in FIG. 1, there is only a single communication device 110, so, the process ends. However, if there were another communication device 110 at the first location 102, then the process would return to block 304 and continue.

Figure 4:
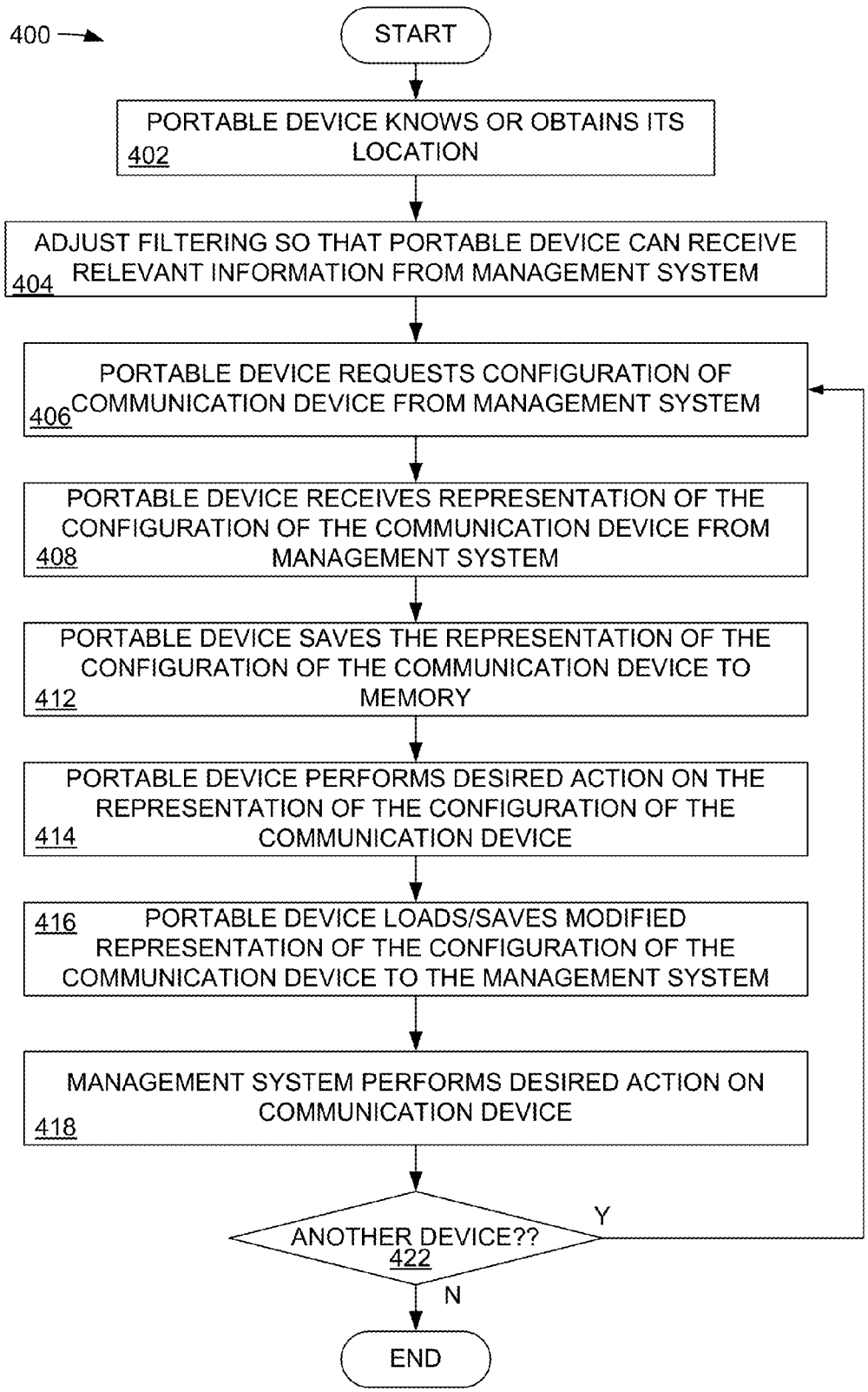
FIG. 4 is a flowchart describing the operation of an alternative embodiment of the system and method for providing customer support using a location-aware portable device.

FIG. 4 is a flowchart 400 describing the operation of an alternative embodiment of the system and method for providing customer support using a location-aware device. FIG. 4 illustrates the operation of a portable device 200-2 before it is located at the first location 102, and before it reaches the communication device 110.

In block 402, the portable device 200 knows or obtains its location, using any of the technologies described in conjunction with the location determining element 210.

In block 404, if the portable device 200 is not yet located at the same location (102 of FIG. 1) at which the communication device (110 of FIG. 1) is located (e.g., if the technical support individual has not yet arrived at the customer location), the filtering can be adjusted and the location can be entered, or modified based on factors, such as distance between the portable device 200 and the communication device 110, so that the relevant information is provided to the portable device 200. If a single communication device 110 is identified by the network management system 120 as being located at the first location 102, the portable device 200 can request all or a portion of the configuration 115b of that communication device 110 from the network management system 120 and can immediately begin editing the configuration 115b of the communication device 110. If there are multiple communication devices at the subject first location 102, then a user of the portable device 200 will select one communication device from a list of communication devices. The portable device 200 will then request the configuration of the selected communication device.

In block 406, the portable device 200 requests the configuration 115b of the communication device 110 from the management system 120 over connection 134 (FIG. 1).

In block 408, the portable device 200 receives the representation of the configuration 115b of the communication device 110 from the management system 120.

In block 412, the portable device 200 saves the representation of the configuration 115b of the communication device 110 to its internal memory 208. In an embodiment, the portable device 200 receives the configuration 115b and saves it to memory 208 as configuration 115b-1.

In block 414, the portable device 200 performs the desired action on the representation of the configuration 115b-1 of the communication device 110. This can entail updating the configuration, modifying the configuration, changing the configuration, performing maintenance on the configuration, or any other action performed on the configuration 115b-1 located within the portable device 200. The modified configuration is shown as 115b-2.

In block 416, the portable device 200 saves a modified representation of the configuration 115b-2 relating to the communication device 110 to the management system 120. Importantly, the portable device 200 does not directly interact with the communication device 110, but instead, receives the configuration 115b from the network management system 120, modifies the configuration as needed, and then transfers, delivers, sends or otherwise provides the modified configuration 115b-2 to the network management system 120.

In block 418, the network management system 120 performs the desired action on the communication device 110, as per the modified configuration 115b-2 received from the portable device 200.

In block 422 it is determined whether there is another communication device 110 to be serviced. In the example shown in FIG. 1, there is only a single communication device 110, so, the process ends. However, if there were another communication device 110 at the first location 102, then the process would return to block 406 and continue.

Figure 5:
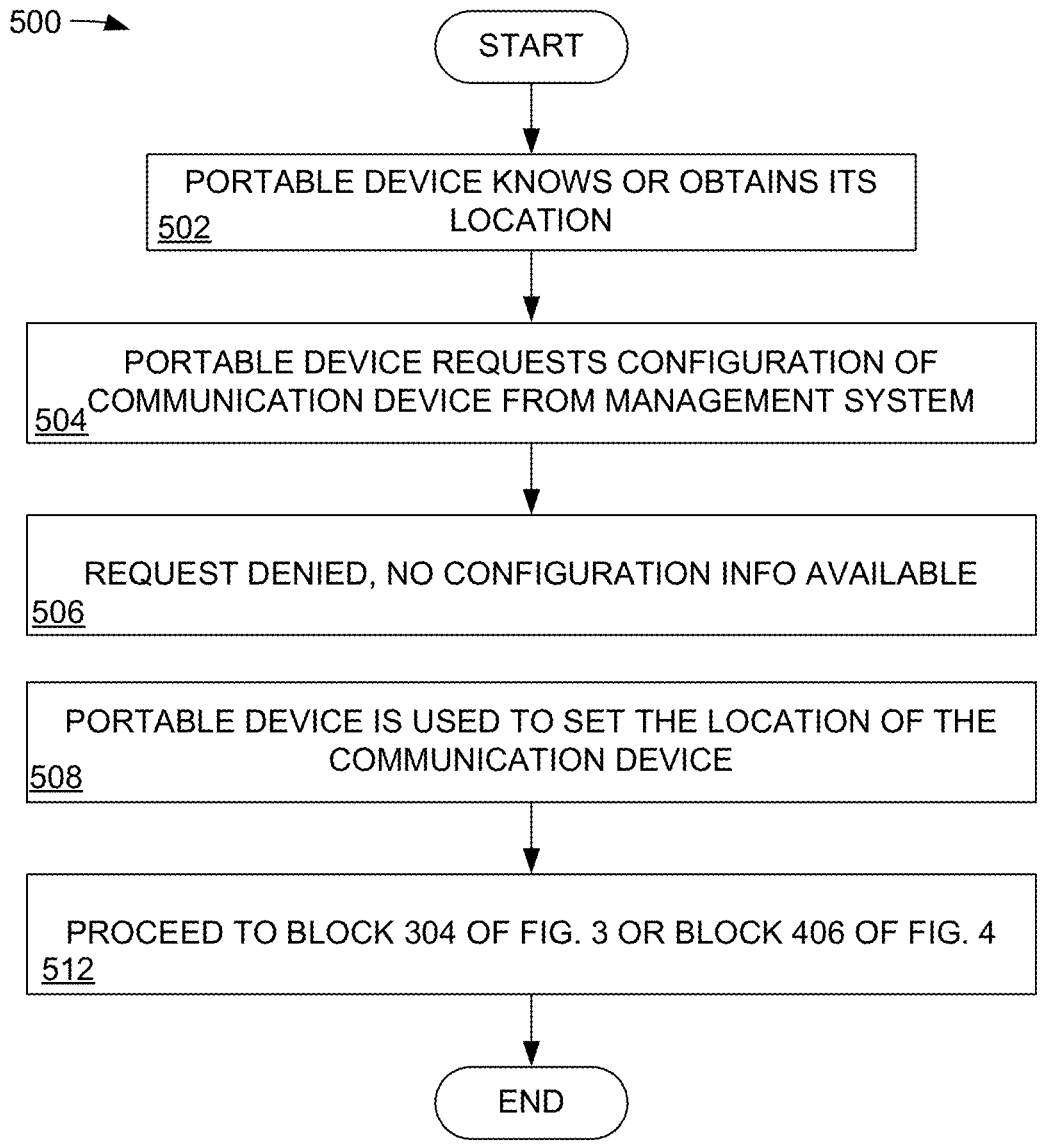
FIG. 5 is a flowchart describing the operation of another alternative embodiment of the system and method for providing customer support using a location-aware portable device.

FIG. 5 is a flowchart 500 describing the operation of another alternative embodiment of the system and method for providing customer support using a location-aware portable device. FIG. 5 illustrates the operation of a portable device 200 to determine and set a location of a communication device 110.

In block 502, the portable device 200 knows or obtains its location, using any of the technologies described in conjunction with the location determining element 210. The location determining element 210 allows the portable device 200 to search for a communication device 110 (FIG. 1) linked to that location, as described above.

In block 504, the portable device 200 requests the configuration 115b of the communication device 110 from the management system 120.

In block 506, the request is denied because the network management system 120 has no configuration available for a communication device at the location established by the portable device 200.

In block 508, the portable device is used to set the location of a communication device at the location established by the portable device 200 by sending the location of the portable device 200 to the network management system 120. The network management system 120 uses the location and identifies the communication device 110. The communication device 110 may be identified by several methods. These include, but are not limited to, serial number, name, MAC (media access control) address, or any other identifying characteristics. Once the communication device 110 is identified to the network management system 120, the location of the communication device 110 is stored within the database 146 in the network management system 120 (FIG. 1).

In block 512, the process proceeds to block 304 of FIG. 3 or block 406 of FIG. 4.

FIGS. 6A through 6G are a series of diagrams showing an example of the operation of an embodiment of the system and method for providing customer support using an exemplary location-aware portable device 200. For example, the portable device 200 can be used to request, receive, modify, save and update a representation of the configuration of a communication device 110. In the example shown in FIG. 6A, the portable device 200 is shown as a smart phone and comprises a display 238. In an embodiment, the display 238 comprises a touch screen display that can be used as an information display and as a user input device. However, such a display is shown for illustration purposes only. Other types of portable devices having other types of input and display features and elements can be implemented. The display 238 can be used to display various user interface features and elements. For example, the portable device 200 comprises an icon 602 that refers to the network management system 120. The initials "MSP" (Managed Server Platform) are exemplary and refer to an example of a network management system 120. A "find device" menu choice 604 refers to the ability of the portable device 200 to locate a communication device, such as the communication device 110, located at a location. In this example, the portable device 200 is located at the first location 102. A "Search" button 606 and a "Use Current Location" button 608 can be activated to search the current location, i.e., in this example, the first location 102 at which the portable device 200 is located. The term "current location" refers to the instant location of the portable device 200.

In FIG. 6B, a "Getting Current Location" icon 609 refers to the portable device 200 establishing its current location using the location determining element 210 (FIG. 2). The icon 609 communicates to a user that the status of the portable device 200 is that it is determining its location and communicating with the network management system 120. In this example, the portable device 200 has communicated its location to the network management system 120 and is awaiting notification of the presence of a communication device or a list of communication devices that are also at (or near) the current location of the portable device 200.

In FIG. 6C, the portable device 200 illustrates that the network management system 120 has identified in its database 146 a communication device 110 at or near the location at which the portable device 200 is located. A window 611 indicates a "Found Device" notification 612. In this example, the "Found Device" is a communication device called "Initech 7100." The nomenclature "Initech 7100" refers to a model or type of communication device and is shown for example only. Each communication device is typically assigned a plain English designator to facilitate communication between users. It is easier to manually search for a name, such as "Initech 7100" rather than remembering and searching for an IP address, a MAC address, or other machine-readable information. To access a representation of the configuration of the communication device (e.g., Initech 7100), the user actuates the "continue" button 614.

In FIG. 6D, the portable device 200 illustrates an alternative embodiment in that the network management system 120 has identified in its database 146 a number of communication devices located at or near the location at which the portable device 200 is located. A window 615 indicates a list of communication devices located at or near the location at which the portable device 200 is located. To proceed with one of the devices in the window 615, a user actuates one of the buttons 616 associated with the selected communication device.

In FIG. 6E the portable device 200 illustrates that the user has actuated the button 616 in FIG. 6D. The icon 617 refers to the communication device (e.g., Initech 7100), the representation of the configuration of which is being accessed by the portable device 200. The display 238 also shows a series of menu items 618 under the icon 617. In this example, the menu items 618 include "Jobs," "Users," "Phones," "Wireless," "Status," "Call Data," and "Network." In this example, the "Jobs" menu item 622 is illustrated as being selected by the user. The user activates the button 623 to select the "Jobs" menu item. At this point, at least a partial configuration 115b-1 of the communication device 110, i.e., the Initech 7100, will have already been transmitted to the portable device 200 along with basic communication device information, such as, for example, name, IP address, and a subset of relevant statistics (CPU usage, heap space, etc.), this information being stored in the database 146.

Figure 6G:
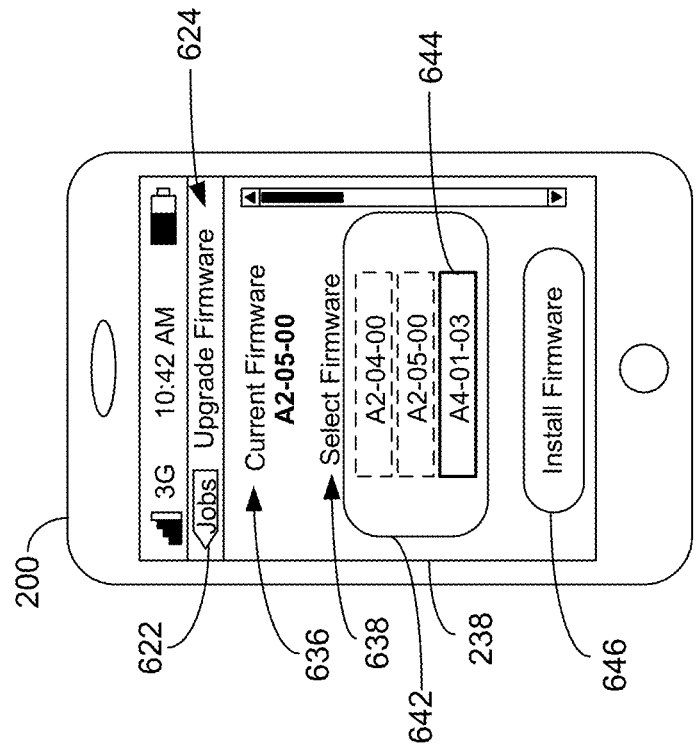
Figure 6F:
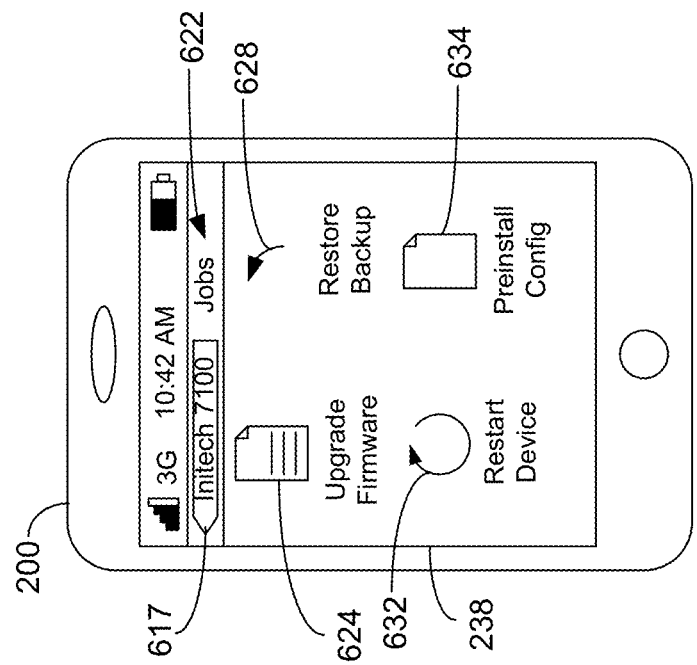

In FIG. 6F, the portable device 200 shows the "Jobs" menu item 622 and further includes menu choices including "Upgrade Firmware" 624, "Restore Backup" 628, "Restart Device" 632, and "Preinstall Config" 634. In the instant example of upgrading the firmware of the communication device 110, the current firmware is given in the at least partial configuration 115b-1. However, when performing some tasks, such as, for example, the Restore Backup task, the portable device 200 would request a list of saved states that have been stored on a backup server, such as on the server implementing the network management system 120.

In FIG. 6G, the user has selected the "Upgrade Firmware" menu item 624 (FIG. 6D). As a result, the illustrative current firmware version 636 is arbitrarily shown as "A2-05-00." This makes the user of the portable device 200 aware of the current firmware configuration of the communication device 110. A select firmware menu heading 638 appears along with a window 642 showing the firmware choices available for the communication device 110. The firmware choice 644, illustratively shown as "A4-01-03" is shown as being selected by the user and is therefore surrounded by a solid box instead of a dotted box. An "Install Firmware" button 646 is shown to allow a user of the portable device 200 to modify the configuration 115b-1 by selecting and updating the firmware to the selected firmware version 644. A modified configuration (115b-2, FIG. 2), is saved and then forwarded, uploaded, or otherwise delivered to the network management system 120. The network management system 120 then updates the configuration of the communication device 110 using the modified configuration 115b-2, by running a script that instructs the communication device 110 to download the new firmware from the network management system 120, and then update its configuration to use the new firmware at the next reboot. In addition, the current firmware is then set as the backup in case there is a problem with the new firmware. Typically this is followed by an immediate reboot of the communication device 110 to begin using the new firmware.

While various embodiments of the invention have been described, it will be apparent to those of ordinary skill in the art that many more embodiments and implementations are possible that are within the scope of this invention.

What is claimed is:

1. A method for providing technical support, comprising:
   determining a location of a portable technical support device;
   forwarding the location to a network management system;
   requesting from the network management system a configuration of a communication device without direct communication between the portable technical support device and the communication device;
   receiving in the portable technical support device from the network management system a representation of a configuration of the communication device;
   saving in the portable technical support device the representation of the configuration of the communication device;
   modifying in the portable technical support device with the representation of the configuration of the communication device and saving a modified representation of the configuration of the communication device in the portable technical support device;
   forwarding from the portable technical support device the modified representation of the configuration of the communication device to the network management system; and applying the modified representation of the configuration to the communication device using the network management system.

2. The method of claim 1, wherein the network management system acts as a communication interface between the portable technical support device and the communication device.

3. The method of claim 1, further comprising using a global positioning system (GPS) to determine a location of the portable technical support device.

4. The method of claim 1, further comprising using cellular triangulation to determine a location of the portable technical support device.

5. The method of claim 1, further comprising using Wi-Fi to determine a location of the portable technical support device.

6. The method of claim 1, wherein the portable technical support device is located at a location at which the communication device is located.

7. The method of claim 1, wherein the portable technical support device is located at a location that is different than the location at which the communication device is located.

8. The method of claim 1, wherein a plurality of communication devices are located at a single location and the portable technical support device is used to select one of the plurality of communication devices for which to obtain from the management system information relating to the selected one of the plurality of communication devices.

9. A method for using a portable technical support device, comprising:

determining a location of a portable technical support device;

forwarding the location to a management system;

requesting from the management system a configuration of a communication device without direct communicating between the portable technical support device and the communication device;

receiving in the portable technical support device from the management system an indication that the configuration is not available;

using the portable technical support device to establish a location of the communication device;

receiving in the portable technical support device from the management system a representation of a configuration of the communication device;

saving in the portable technical support device the representation of the configuration of the communication device;

modifying in the portable technical support device with the representation of the configuration of the communication device and saving a modified representation of the configuration of the communication device in the portable technical support device;

forwarding from the portable technical support device the modified representation of the configuration of the communication device to the management system; and applying the modified representation of the configuration to the communication device using the management system.

10. The method of claim 9, further comprising identifying the communication device using one of serial number, name, and MAC (media access control) address.

* * * * *